United States Patent
Chen (10) Patent No.: US 11,391,357 B2
(45) Date of Patent: Jul. 19, 2022

(54) ADJUSTMENT DEVICE FOR BEVEL GEAR, AUTOMATIC ADJUSTMENT SYSTEM FOR BEVEL GEAR AND ADJUSTMENT METHODS FOR BEVEL GEAR

(71) Applicant: INDUSTRIAL TECHNOLOGY RESEARCH INSTITUTE, Hsinchu (TW)

(72) Inventor: Lei-Yi Chen, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 510 days.

(21) Appl. No.: 16/656,266

(22) Filed: Oct. 17, 2019

(65) Prior Publication Data
US 2021/0033186 A1   Feb. 4, 2021

(30) Foreign Application Priority Data

Jul. 30, 2019   (TW) .................................. 108127033

(51) Int. Cl.
| F16H 55/20 | (2006.01) |
| F16H 55/08 | (2006.01) |
| F16H 57/038 | (2012.01) |

(52) U.S. Cl.
CPC ........... *F16H 55/20* (2013.01); *F16H 55/088* (2013.01); *F16H 57/038* (2013.01)

(58) Field of Classification Search
CPC ...... F16H 57/038; F16H 57/022; F16H 57/12; F16H 2057/0221; F16H 2057/0225;
(Continued)

(56) References Cited

U.S. PATENT DOCUMENTS

| 2,924,125 A | 2/1960 | Brandon |
| 3,636,789 A * | 1/1972 | Geiger .................... F16H 57/12 74/409 |

(Continued)

FOREIGN PATENT DOCUMENTS

| CN | 203686092 U | 7/2014 |
| CN | 104006157 A | 8/2014 |

(Continued)

OTHER PUBLICATIONS

TW Office Action in Application No. 108127033 dated Apr. 24, 2020.

(Continued)

*Primary Examiner* — Daniel D Yabut
(74) *Attorney, Agent, or Firm* — Maschoff Brennan (57) ABSTRACT

An adjustment device configured to move first bevel gear and second bevel gear that are disposed on base and are meshed with each other. Adjustment device includes first adjustment assembly, and second adjustment assembly. First adjustment assembly includes first fluid-driven power source, first brake component and first displacement sensor. First fluid-driven power source includes first cylinder housing and first piston. First cylinder housing is configured to be disposed on base. First piston is movably disposed on first cylinder housing. First bevel gear is configured to be disposed on first piston. First piston is configured to move first bevel gear along first axial direction. First brake component is configured to be disposed on base and configured to stop or release first piston. First displacement sensor is disposed on first cylinder housing and configured to generate displacement data related to first piston.

17 Claims, 6 Drawing Sheets

(58) Field of Classification Search
CPC ......... F16H 2057/128; F16H 2057/123; F16H 55/088; F16H 55/20; F16H 55/18; F16H 1/14; F16H 1/145; F16C 35/078
See application file for complete search history.

(56) References Cited

U.S. PATENT DOCUMENTS

| | | | |
|---|---|---|---|
| 3,943,789 A * | 3/1976 | Mann | F16H 57/038 74/421 A |
| 4,084,756 A | 4/1978 | Coxhill | |
| 5,743,145 A | 4/1998 | Terada et al. | |
| 5,813,283 A * | 9/1998 | Chen | B23Q 5/045 74/405 |
| 6,785,943 B2 | 9/2004 | Sheehan et al. | |
| 8,567,277 B2 | 10/2013 | Long | |
| 8,813,595 B2 | 8/2014 | Kawakatsu et al. | |
| 2017/0261049 A1 | 9/2017 | Nozu et al. | |

FOREIGN PATENT DOCUMENTS

| | | |
|---|---|---|
| CN | 204437191 U | 7/2015 |
| CN | 106226073 A | 12/2016 |
| CN | 107191504 A | 9/2017 |
| CN | 207583982 U | 7/2018 |
| CN | 209738812 U | 12/2019 |
| TW | M289716 U | 4/2006 |
| TW | 201528161 A | 7/2015 |
| TW | I509536 B | 11/2015 |

OTHER PUBLICATIONS

Handschuh et al. "Comparison of Experimental and Analytical Tooth Bending Stress of Aerospace Spiral Bevel Gears" NASA/TM, Feb. 1999, pp. 1-13.

Hale et al. "Design of anti-backlash transmissions for precision position control systems" Precision Engineering, Oct. 1994, vol. 16 No. 4, pp. 244-258.

Stephen Marsh "How to Design and Install Bevel Gears for Optimum Performance" Gear Technology, Jun./Jul. 2013, pp. 60-69.

Dempsey et al. "Integrating Condition Indicators and Usage Parameters for Improved Spiral Bevel Gear Health Monitoring" NASA/TM, Jun. 2013, pp. 1-11.

Steve Lovell "Large Bevel Gears for Crushing Applications" Gear Iechnology, Jan./Feb. 2019, pp. 76-79.

Eric C. Ames "Repair of High Value/High Demand Spiral Bevel Gears by Superfinishing" the American Helicopter Society 67th Annual Forum, May 3, 2011, pp. 1-12.

* cited by examiner

ADJUSTMENT DEVICE FOR BEVEL GEAR, AUTOMATIC ADJUSTMENT SYSTEM FOR BEVEL GEAR AND ADJUSTMENT METHODS FOR BEVEL GEAR

CROSS-REFERENCE TO RELATED APPLICATIONS

This non-provisional application claims priority under 35 U.S.C. § 119(a) on Patent Application No(s). 108127033 filed in Taiwan, R.O.C. on Jul. 30, 2019, the entire contents of which are hereby incorporated by reference.

TECHNICAL FIELD

The disclosure relates to an adjustment device for bevel gear, an automatic adjustment system for bevel gear and an adjustment method for bevel gear, more particularly to an adjustment device, an automatic adjustment system and an adjustment method that use fluid-driven power source to adjust backlash and contact pattern between two engaging bevel gears.

BACKGROUND

Bevel gears are a type of gear used to transmit power from one axis to another non-parallel axis. The bevel gears are widely used in various fields, such as precision machinery, automatic machinery, transportation and aerial vehicle. It is important to keep proper tooth contact in consideration of the bevel gears in balance, so the engaging bevel gears shall be adjusted to the correct positions to have a proper backlash and contact pattern therebetween.

Conventionally, the position adjustment of the bevel gears is achieved by adjusting the number of spacers. In detail, if one of the bevel gears is required to be moved to a higher position, one can add a certain amount of spacers underneath that bevel gear; on the other hands, if one of the bevel gears is required to be moved to a lower position, one can remove the spacers. However, adding and removing the spacers are troublesome and time-consuming because such processes require detaching and reinstalling the bevel gears.

In addition, the backlash and the contact pattern between the engaging bevel gears will gradually change due to the abrasion or wear on the teeth surface of the bevel gears, which results in vibration noise. To solve this problem, the backlash and the contact pattern must be readjusted after a certain period of time. Therefore, the above troublesome processes have to be performed repeatedly. As such, how to simplify the adjustment process of the backlash and the contact pattern of the engaging bevel gears becomes an important topic in related fields.

SUMMARY

One embodiment of this disclosure provides an adjustment device configured to move a first bevel gear and a second bevel gear that are disposed on a base and are meshed with each other. The adjustment device includes a first adjustment assembly, and a second adjustment assembly. The first adjustment assembly includes a first fluid-driven power source, a first brake component and a first displacement sensor. The first fluid-driven power source includes a first cylinder housing and a first piston. The first cylinder housing is configured to be disposed on the base. The first piston is movably disposed on the first cylinder housing. The first bevel gear is configured to be disposed on the first piston. The first piston is configured to move the first bevel gear along a first axial direction. The first brake component is configured to be disposed on the base and configured to stop or release the first piston. The first displacement sensor is disposed on the first cylinder housing and configured to generate a displacement data related to the first piston. The second adjustment assembly includes a second fluid-driven power source, a second brake component, and a second displacement sensor. The second fluid-driven power source includes a second cylinder housing and a second piston. The second cylinder housing is configured to be disposed on the base. The second piston is movably disposed on the second cylinder housing. The second bevel gear is configured to be disposed on the second piston. The second piston is configured to move the second bevel gear along a second axial direction different from the first axial direction. The second brake component is disposed on the base and configured to stop or release the second piston. The second displacement sensor is disposed on the second cylinder housing and configured to generate a displacement data related to the second piston.

Another embodiment of this disclosure provides an automatic adjustment system for bevel gear, and including a base, a transmission mechanism, the adjustment device, a detecting device, an analysis device, a control device, a first driving device and a second driving device. The transmission mechanism includes a first shaft, a second shaft, a first bevel gear and a second bevel gear. The first shaft is rotatably disposed on the base about a first axis. The second shaft is rotatably disposed on the base about a second axis different from the first axis. The first bevel gear is fixed on the first shaft and movable along the first axis. The second bevel gear is fixed on the second shaft and movable along the second axis. The first bevel gear and the second bevel gear are meshed with each other. The detecting device is configured to generate an operation vibration data related to the transmission mechanism. The analysis device is configured to analyze the operation vibration data and a reference vibration data. The control device is configured to generate displacement data of the first bevel gear and the second bevel gear based on an analysis result of the operation vibration data and the reference vibration data. The control device is configured to activate at least one of the first driving device and the second fluid-driven power source to drive the first fluid-driven power source according to the displacement data so as to move at least one of the first bevel gear and the second bevel gear. The control device is configured to activate the second driving device to activate at least one of the first brake component and the second brake component according to the displacement data so as to stop or release at least of the first piston and the second piston.

Still yet another embodiment of this disclosure provides an adjustment method configured to move at least one of a first bevel gear and a second bevel gear that are meshed with each other. The adjustment method includes activating a first brake component to release a first piston of a first fluid-driven power source, wherein the first bevel gear is configured to be disposed on the first piston, adjusting an amount of a working fluid that enters into the first fluid-driven power source by a first driving device so as to force the first piston to move relative to a first cylinder housing of the first fluid-driven power source, detecting a displacement of the first piston by a first displacement sensor, and stopping the first piston by the first brake component as the first piston has moved by a predetermined displacement.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
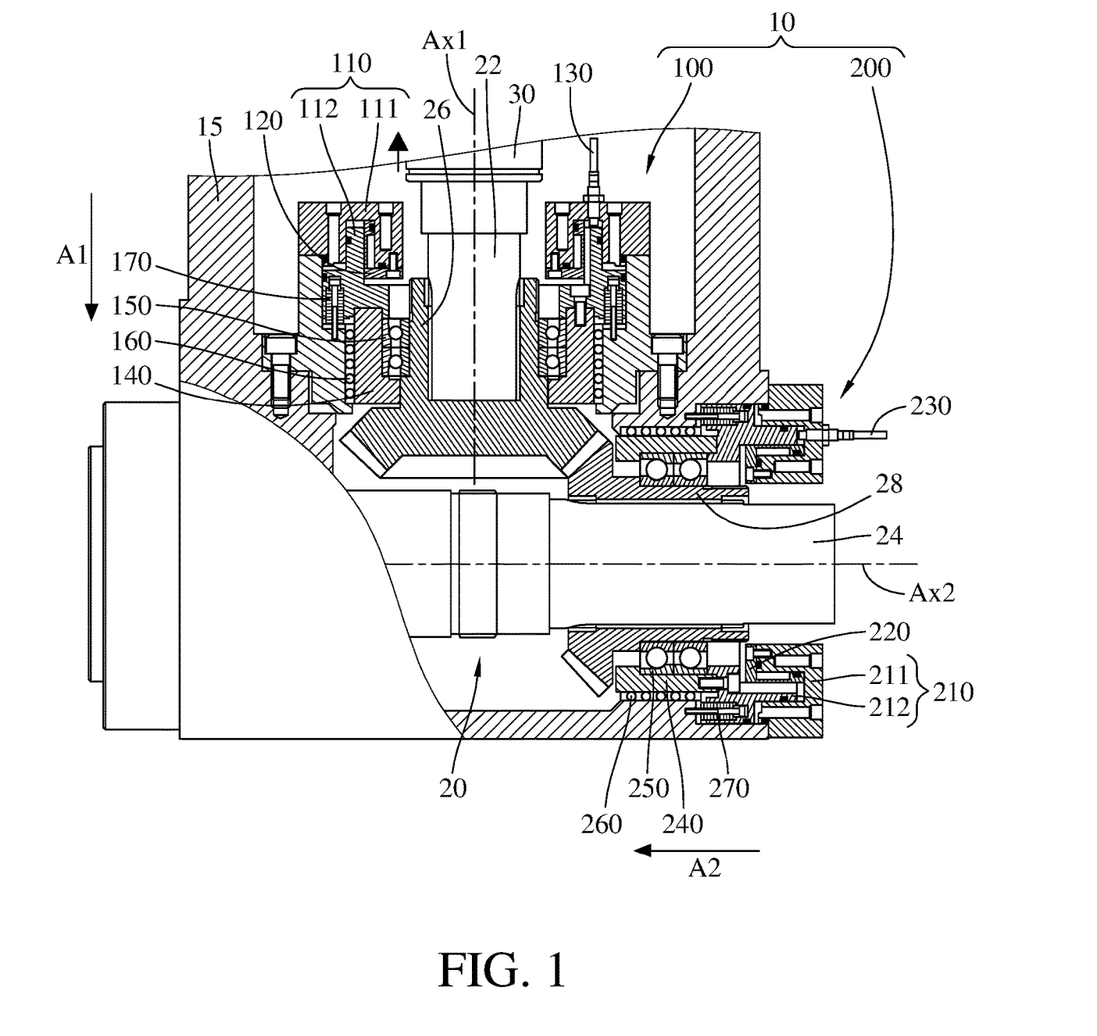
FIG. 1 is a partial cross-sectional view of an adjustment device for bevel gear according to a first embodiment of the disclosure.
Figure 2:
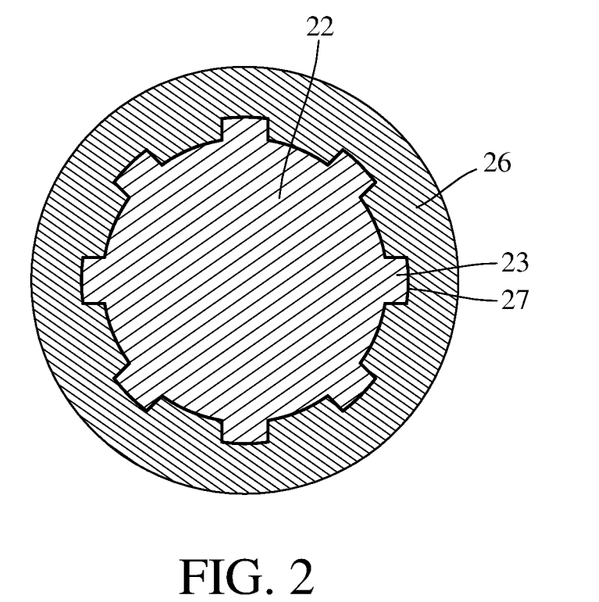
FIG. 2 is a partially enlarged cross-sectional view of the adjustment device in FIG. 1.
Figure 3:
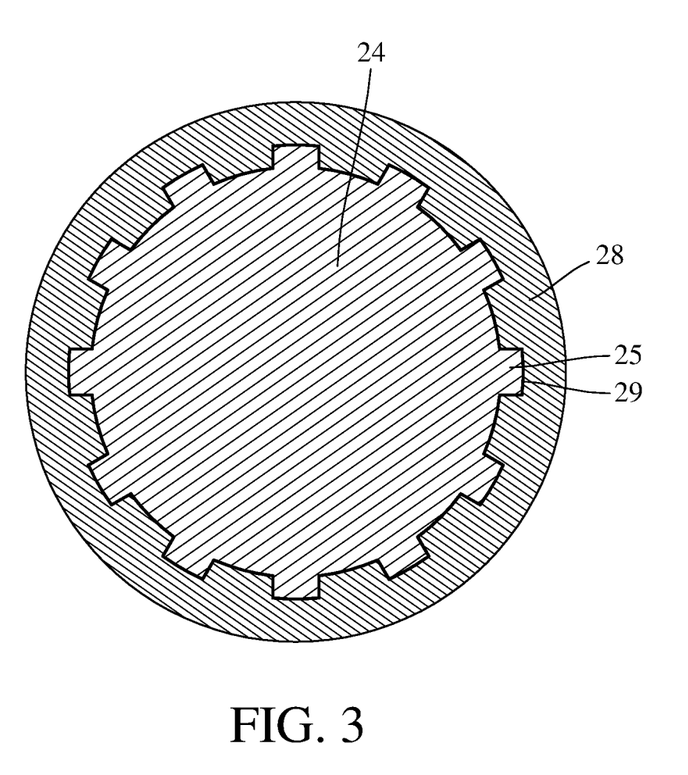
FIG. 3 is a partially enlarged cross-sectional view of the adjustment device in FIG. 1.

Referring to FIG. 1 to FIG. 3, where FIG. 1 is a partial cross-sectional view of an adjustment device 10 according to a first embodiment of the disclosure, FIG. 2 is a partially enlarged cross-sectional view of the adjustment device in FIG. 1, and FIG. 3 is a partially enlarged cross-sectional view of the adjustment device in FIG. 1.

In this embodiment, the adjustment device 10 is configured for adjusting a backlash and a contact pattern of bevel gears (e.g., a first bevel gear 26 and a second bevel gear 28 shown in the figures). The first bevel gear 26 and the second bevel gear 28 are parts of a transmission mechanism 20. In this embodiment, the transmission mechanism 20 further includes a first shaft 22 and a second shaft 24. The first shaft 22 and the second shaft 24 are rotatably disposed on a base 15. The first bevel gear 26 is movably disposed on the first shaft 22 along a first axis Ax1, and the second bevel gear 28 is movably disposed on the second shaft 24 along a second axis Ax2, where the first axis Ax1 is non-parallel to the second axis Ax2. That is, a first axial direction A1 of the first shaft 22 is substantially perpendicular to a second axial direction A2 of the second shaft 24. In addition, the first bevel gear 26 and the second bevel gear 28 are meshed with each other. Therefore, the position of the first bevel gear 26 on the first shaft 22 can be adjusted, and the position of the second bevel gear 28 on the second shaft 24 can be adjusted as well. In other words, the first bevel gear 26 is allowed to be moved close to or away from the second bevel gear 28, and the second bevel gear 28 is allowed to be moved close to or away from the first bevel gear 26, such that the backlash and the contact pattern between the first bevel gear 26 and the second bevel gear 28 can be adjusted.

In this and other embodiments, the term "backlash" is a gap between two engaging tooth surfaces of the first bevel gear 26 and the second bevel gear 28, and the term "contact pattern" is the area in which the gear teeth of the bevel gears 26 and 28 come in contact as they engage and disengage during their rotation.

Referring to FIG. 2 and FIG. 3, in this embodiment, the first shaft 22 has at least one first spline 23, the first bevel gear 26 has at least one second spline 27, and the second spline 27 is meshed with the first spline 23; therefore, the first bevel gear 26 is allowed to be moved relative to the first shaft 22 along the first axial direction A1 but is not allowed to be rotated relative to the first shaft 22. The second shaft 24 has at least one third spline 25, the second bevel gear 28 has at least one fourth spline 29, and the fourth spline 29 is meshed with the third spline 25; therefore, the second bevel gear 28 is allowed to be moved relative to the second shaft 24 along the second axial direction A2 but is not allowed to be rotated relative to the second shaft 24. In this embodiment, as shown in FIG. 2, the first spline 23 and the second spline 27 are in, for example, rectangular shape, where the first spline 23 has eight ridges and eight grooves, and the second spline 27 has eight teeth and eight grooves that mesh with the ridges and grooves of the first spline 23. As shown in FIG. 3, the third spline 25 and the fourth spline 29 are in, for example, rectangular shape, where the third spline 25 has twelve ridges and twelve grooves, and the fourth spline 29 has twelve teeth and twelve grooves that mesh with the ridges and grooves of the third spline 25. Note that the numbers of the ridges, teeth and grooves of the first spline 23, the second spline 27, the third spline 25 and the fourth spline 29 are not particularly restricted and can be modified to, for example, six, ten or other numbers.

Referring to FIG. 1, the first shaft 22 is connected to a power source 30. The power source 30 is, for example, a motor. The power source 30 is able to drive the first shaft 22 to rotate relative to the base 15 so as to rotate the first bevel gear 26 about the first axial direction A1. The rotating movement of the first bevel gear 26 drives the second bevel gear 28 and the second shaft 24 to rotate about the second axial direction A2.

Note that the axial directions of the first shaft and the second shaft are not restricted to be perpendicular to each other. In other embodiments, the axial directions of the first shaft and the second shaft can be positioned to have any other proper angles therebetween.

Referring to FIG. 1, the adjustment device 10 further includes a first adjustment assembly 100 and a second adjustment assembly 200. The first adjustment assembly 100 includes a first fluid-driven power source 110, a first brake component 120 and a first displacement sensor 130.

The first fluid-driven power source 110 is, for example, a hydraulic cylinder or a pneumatic cylinder. In this embodiment, the first fluid-driven power source 110 includes a first cylinder housing 111 and a first piston 112. The first cylinder housing 111 is disposed on the base 15. The first piston 112 is movably disposed on and can be moved by the first cylinder housing 111, and the first bevel gear 26 is connected to the first piston 112, such that the first bevel gear 26 can be moved along the first axial direction A1 or a direction opposite to the first axial direction A1 by being driven by the first piston 112.

In more detail, the first adjustment assembly 100 further includes a first bearing housing 140, a first bearing 150 and a first friction reduction member 160. The first bearing housing 140 is fixed to the first piston 112 via screws or in a press-fit manner. The first bearing 150 is disposed on the first bearing housing 140 and is, for example, a ball bearing. The first bevel gear 26 is rotatably disposed through the first bearing 150 so as to be rotatably disposed on the first bearing housing 140. The first friction reduction member 160 is, for example, a ball bushing and is clamped by the first bearing housing 140 and the base 15. Therefore, the first bearing housing 140 and the first bevel gear 26 fixed on the first bearing housing 140 are allowed to be moved relative to the base 15 along the first axial direction A1 or the direction opposite to the first axial direction A1.

The first bearing 150 is not limited to be a ball bearing; in other embodiments, the first bearing may be a roller bearing or other types of bearings that help the first bevel gear to be rotated relative to the first bearing housing. In addition, the first friction reduction member 160 is not limited to be a ball bushing; in other embodiments, the first friction reduction member may be a guide rail or other suitable friction reduction members that help the first bearing housing to be moved relative to the base. Further, the first friction reduction member 160 is optional; in other embodiments, the first adjustment assembly may not include the first friction reduction member but is provided lubricant between the first bearing housing and the base for minimizing friction therebetween.

In this embodiment, the first fluid-driven power source 110 is, for example, a single-acting cylinder; in such a case, the working fluid in the first fluid-driven power source 110 only acts on one side of the first piston 112 of the first fluid-driven power source 110 to force the first piston 112 to move along the first axial direction A1 and more extending from the first cylinder housing 111, but the movement of the first piston 112 in opposite direction may rely on another force provided by, for example, a spring. In detail, in this embodiment, the first adjustment assembly 100 further includes a first elastic component 17, one end of the first elastic component 170 presses against the base 15, the other end of the first elastic component 170 presses against the other of the first piston 112 located away from the first cylinder housing 111, and the first elastic component 17, is for example, a disc spring. When the working fluid (e.g. working liquid or working gas) enters into the first fluid-driven power source 110, the working fluid forces the first piston 112 to move along the first axial direction A1 so as to deform the first elastic component 170. While the working fluid is flowing out of the first fluid-driven power source 110, the working fluid in the first cylinder housing 111 becomes fewer and exerts lesser pressure on the first piston 112 so that the energy stored in the first elastic component 170 is released to push the first piston 112 along the direction opposite to the first axial direction A1 and become more retracted to the first cylinder housing 111.

However, the first fluid-driven power source 110 is not limited to be a single-acting cylinder; in other embodiments, the first fluid-driven power source may be a double-acting cylinder and can operate without the aforementioned first elastic component 170.

The first brake component 120 is a fluid-driven component, such as a brake ring. The first brake component 120 is disposed on the base 15 and is configured to stop or release the first piston 112. When the first brake component 120 releases the first piston 112, the first piston 112 is allowed to be moved. When the first piston 112 is required to be fixed in a specific position, the first brake component 120 can be used to stop the movement of the first piston 112. Note that the fluid used to activate the first brake component 120 can be in liquid form (e.g. oil) or gas form.

In addition, the first brake component 120 is not limited to be a brake ring; in other embodiments, the first brake component may be an electromagnetic brake that is driven by electromagnetic force.

The first displacement sensor 130 is disposed on the first cylinder housing 111. The first displacement sensor 130 is configured to detect the displacement of the first piston 112 so as to generate a displacement data of the first piston 112.

The second adjustment assembly 200 includes a second fluid-driven power source 210, a second brake component 220 and a second displacement sensor 230.

The second fluid-driven power source 210 is, for example, a hydraulic cylinder or a pneumatic cylinder. In this embodiment, the second fluid-driven power source 210 includes a second cylinder housing 211 and a second piston 212. The second cylinder housing 211 is disposed on the base 15. The second piston 212 is movably disposed on and can be moved by the second cylinder housing 211, and the second bevel gear 28 is connected to the second piston 212, such that the second bevel gear 28 can be moved along the second axial direction A2 or a direction opposite to the second axial direction A2 by the second piston 212.

In more detail, the second adjustment assembly 200 further includes a second bearing housing 240, a second bearing 250 and a second friction reduction member 260. The second bearing housing 240 is fixed to the second piston 212 via screws or in a press fit manner. The second bearing 250 is disposed on the second bearing housing 240 and is, for example, a ball bearing. The second bevel gear 28 is rotatably disposed through the second bearing 250 so as to be able to be rotatably disposed on the second bearing housing 240. The second friction reduction member 260 is, for example, a ball bushing, and is clamped by the second bearing housing 240 and the base 15. Therefore, the second bearing housing 240 and the second bevel gear 28 fixed on the second bearing housing 240 are allowed to be moved relative to the base 15 along the second axial direction A2 or the direction opposite to the second axial direction A2.

The second bearing 250 is not limited to be a ball bearing; in other embodiments, the second bearing may be a roller bearing or other types of bearings that help the second bevel gear to be rotated relative to the second bearing housing. In addition, the second friction reduction member 260 is not limited to be a ball bushing; in other embodiments, the second friction reduction member may be a guide rail or other suitable friction reduction members that help the second bearing housing to be moved relative to the base. Further, the second friction reduction member 260 is optional; in other embodiments, the second adjustment assembly may not include the second friction reduction member but is provided lubricant between the second bearing housing and the base for minimizing friction therebetween.

In this embodiment, the second fluid-driven power source 210 is, for example, a single-acting cylinder; in such a case, the working fluid in the second fluid-driven power source 210 only acts on one side of the second piston 212 of the second fluid-driven power source 210, to force the second piston 212 to move along the second axial direction A2 and more extending from the second cylinder housing 210, but the movement of the second piston 212 in opposite direction may rely on another force provide by, for example, a spring. In detail, in this embodiment, the second adjustment assembly 200 further includes a second elastic component 270, one end of the second elastic component 270 presses against the base 15, the other end of the second elastic component 270 presses against a side of the second piston 212 located away from the second cylinder housing 211, and the second elastic component 270 is, for example, a disc spring. When the working fluid (e.g. working liquid or working gas) enters into the second fluid-driven power source 210, the working fluid forces the second piston 212 to move along the second axial direction A2 so as to deform the second elastic component 270. While the working fluid is flowing out of the second fluid-driven power source 210, the working fluid in the second cylinder housing 211 becomes fewer and exerts lesser pressure on the second piston 212 so that the energy stored in the second elastic component 270 can push the second piston 212 along the direction opposite to the second axial direction A2 and become more retracted to the second cylinder housing 211.

However, the second fluid-driven power source 210 is not limited to be a single-acting cylinder; in other embodiments, the second fluid-driven power source may be a double-acting cylinder and can operate without the aforementioned second elastic component 270.

The second brake component 220 is a fluid-driven component, such as a brake ring. The second brake component 220 is disposed on the base 15 and the second brake component 220 is configured to stop or release the second piston 212. When the second brake component 220 releases the second piston 212, the second piston 212 is allowed to be moved. When the second piston 212 is required to be fixed in a specific position, the second brake component 220 can be used to stop the movement of the second piston 212. Note that the fluid used to activate the second brake component 220 can be in liquid form (e.g. oil) or gas form.

In addition, the second brake component 220 is not limited to be a brake ring; in other embodiment, the second brake component may be an electromagnetic brake that is driven by electromagnetic force.

The second displacement sensor 230 is disposed on the second cylinder housing 211. The second displacement sensor 230 is configured to detect the displacement of the second piston 212 so as to generate a displacement data of the second piston 212.

The aforementioned adjustment device 10 can adjust the backlash and the contact pattern between the first bevel gear 26 and the second bevel gear 28 of the transmission mechanism 20 by an automatic adjustment system or in a manual manner. In the following paragraphs, the adjustment device 10 is operated by, for example, an automatic adjustment system.

Figure 4:
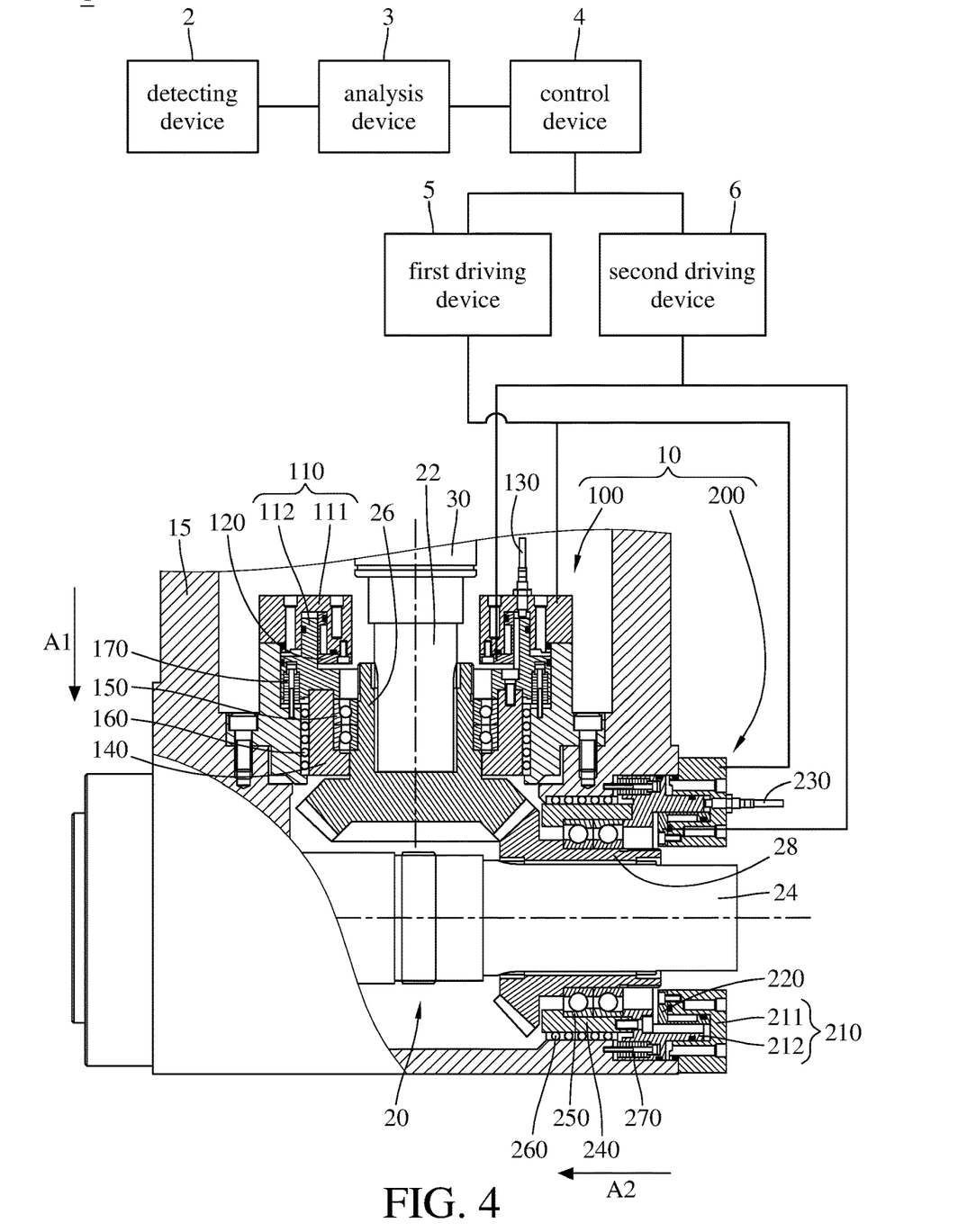
FIG. 4 is a schematic view of an automatic adjustment system for bevel gear according to a second embodiment of the disclosure.

Please refer to FIG. 4, where FIG. 4 is a schematic view of an automatic adjustment system 1 for bevel gear according to a second embodiment of the disclosure. Besides the aforementioned adjustment device 10, base 15 and transmission mechanism 20, the automatic adjustment system 1 further includes a detecting device 2, an analysis device 3, a control device 4, a first driving device 5 and a second driving device 6. The detecting device 2 is disposed on the base 15 and is, for example, an accelerometer. The detecting device 2 is configured to detect the activity, such as the vibration, of the transmission mechanism 20 and thus generating an operation vibration data. The analysis device 3 is configured to analyze the operation vibration data based on a reference vibration data. The control device 4 is configured to generate displacement data respectively for the first bevel gear 26 and the second bevel gear 28 according to the analysis result of the operation vibration data and the reference vibration data.

The first driving device 5 includes, for example, two independent fluid valves respectively connected to the first fluid-driven power source 110 and the second fluid-driven power source 210. According to the displacement data, the control device 4 controls the fluid valves of the first driving device 5 to determine how much the working fluid is required to flow into or out of the first fluid-driven power source 110 and the second fluid-driven power source 210. As such, the control device 4 is able to activate the first fluid-driven power source 110 to move the first bevel gear 26 and activate the second fluid-driven power source 210 to move the second bevel gear 28 by controlling the first driving device 5.

The second driving device 6 includes, for example, two independent fluid valves, and when the first bevel gear 26 and the second bevel gear 28 are moved by predetermined displacements, meaning that the backlash or the contact pattern between the first bevel gear 26 and the second bevel gear 28 reaches a predetermined amount. The control device 4 activates the first brake component 120 and the second brake component 220 via the second driving device 6 so as to respectively stop the first piston 112 and the second piston 212.

Figure 5:
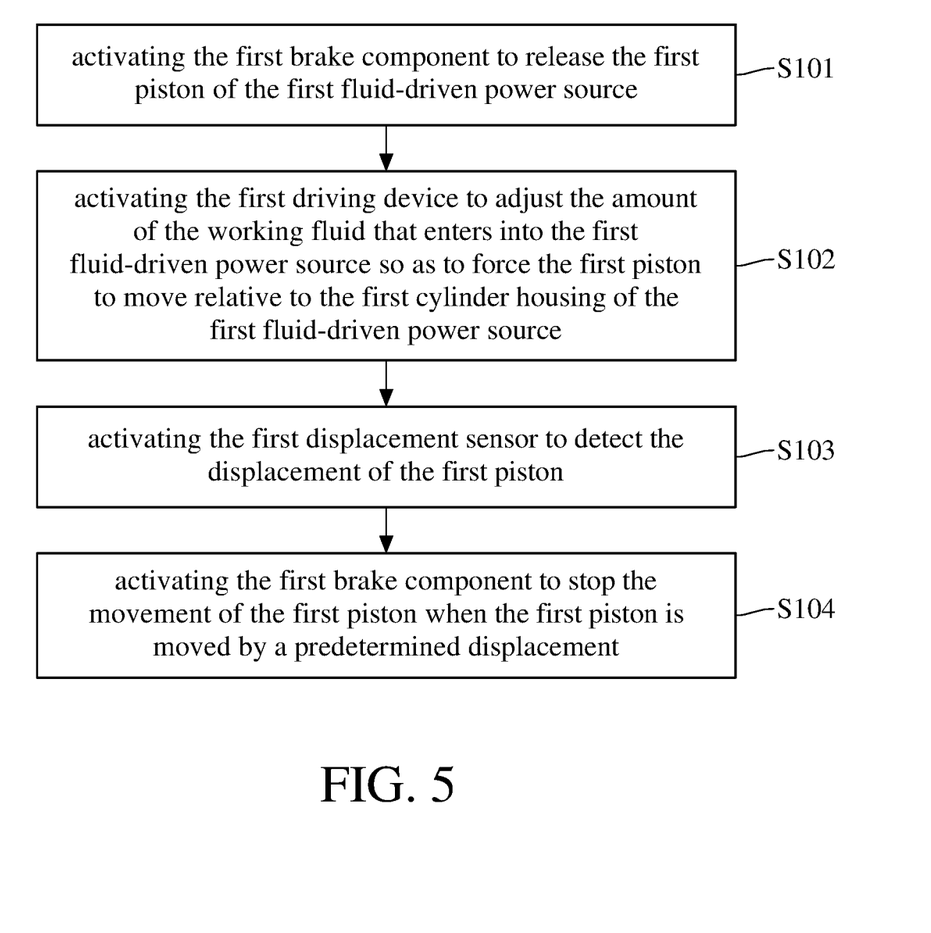
FIG. 5 is a flow chart of an adjustment method for adjusting a first bevel gear in FIG. 1.
Figure 6:
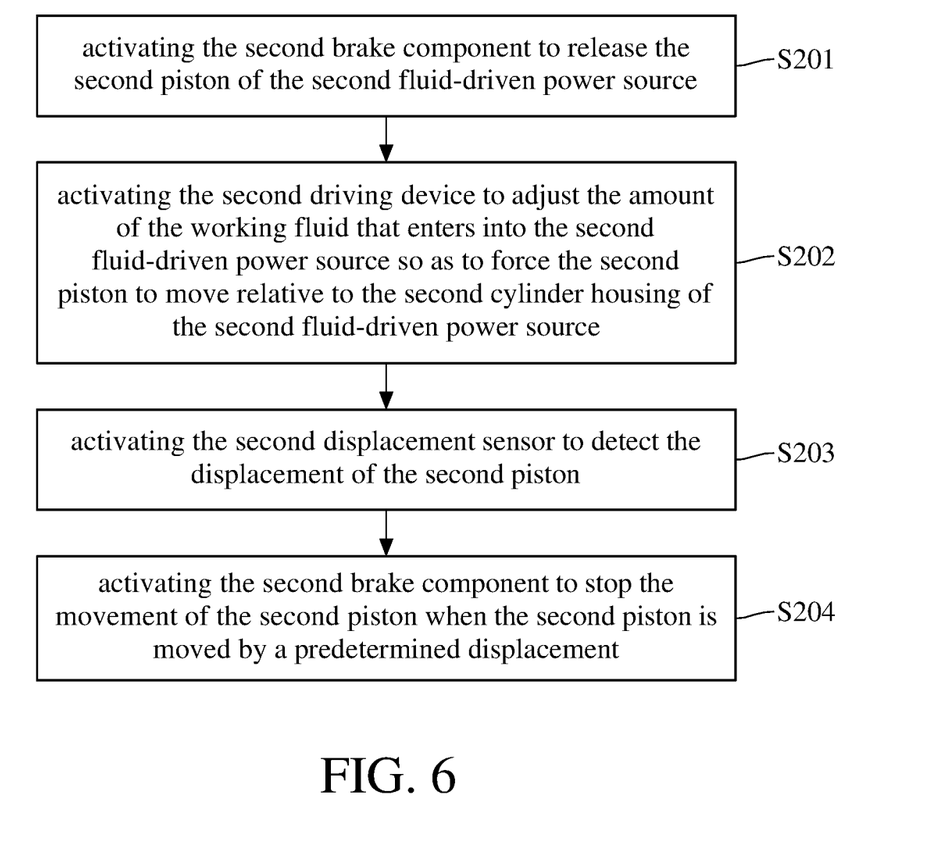
FIG. 6 is a flow chart of an adjustment method for adjusting a second bevel gear in FIG. 1.

Next, an adjustment method for adjusting the bevel gears by the above adjustment device is described. Please refer to FIG. 5 and FIG. 6, where FIG. 5 is a flow chart of an adjustment method for adjusting a first bevel gear in FIG. 1, and FIG. 6 is a flow chart of an adjustment method for adjusting a second bevel gear in FIG. 1. Hereinafter, detail steps of the adjustment method provided by this embodiment are illustrated with reference to the components of the adjustment device 10 shown in FIG. 1.

Referring to FIG. 5, adjusting the backlash or the contact pattern between the first bevel gear 26 and the second bevel gear 28 at least includes the following steps. In step S101, the control device 4 activates the first brake component 120 to release the first piston 112 of the first fluid-driven power source 110 to allow the first piston 112 to be moved relative to the first cylinder housing 111 along the first axial direction A1 or the direction opposite to the first axial direction A1.

Then, in step S102, the first driving device 5 adjusts the amount of the working fluid that enters into the first fluid-driven power source 110 so as to force the first piston 112 to move relative to the first cylinder housing 111 of the first fluid-driven power source 110. In detail, when the first bevel gear 26 is required to be moved along the first axial direction A1, the control device 4 activates the first driving device 5 to inject more of the working fluid into the first fluid-driven power source 110 so as to force the first piston 112 to extend more from the first cylinder housing 111, such that the first bevel gear 26 will be moved along the first axial direction A1 by the first piston 112.

On the other hand, when the first bevel gear 26 is required to be moved along the direction opposite to the first axial direction A1, the control device 4 activates the first driving device 5 to discharge part of the working fluid from the first fluid-driven power source 110 so that the first elastic component 17 can push the first piston 112 to be more retracted to the first cylinder housing 111, and such movement of the first piston 112 would move the first bevel gear 26 along the direction opposite to the first axial direction A1.

Meanwhile, in step S103, the control device 4 activates the first displacement sensor 130 to detect the displacement of the first piston 112, and the first displacement sensor 130 generates a displacement data accordingly. Then, in step S104, when the first piston 112 is moved by a predetermined displacement, meaning that the backlash or the contact pattern between the first bevel gear 26 and the second bevel gear 28 reaches a predetermined amount, the control device 4 activates the first brake component 120 to stop the movement of the first piston 112 and fix the first piston 112 in position. By doing so, the backlash or the contact pattern between the first bevel gear 26 and the second bevel gear 28 is fixed at the predetermined amount. The predetermined displacement of the first piston 112 and the predetermined amount of the backlash or the contact pattern were determined heuristically or by automatic computation result.

As shown in FIG. 6, as the backlash or the contact pattern is required to be adjusted by moving the second bevel gear 28, step S201 is firstly performed. In step S201, the control device 4 activates the second brake component 220 to release the second piston 212 so that the second piston 212 is allowed to be moved relative to the second cylinder housing 211 along the second axial direction A2 or the direction opposite to the second axial direction A2.

Next, in step S202, the second driving device 6 adjusts the amount of the working fluid that enters the second fluid-driven power source 210 so as to force the second piston 212 to move relative to the second cylinder housing 211 of the second fluid-driven power source 210. In detail, when the second bevel gear 28 is required to be moved along the second axial direction A2, the control device 4 activates the second driving device 6 to inject more of the working fluid into the second fluid-driven power source 210 so as to force the second piston 212 to more extend from the second cylinder housing 211, such that the second bevel gear 28 would be moved along the second axial direction A2 by the second piston 212.

On the other hand, when the second bevel gear 28 is required to be moved along the direction opposite to the second axial direction A2, the control device 4 activates the second driving device 6 to discharge part of the working fluid from the second fluid-driven power source 210 so that the second piston 212 is more retracted to the second cylinder housing 211, and such movement would move the second bevel gear 28 along the direction opposite to the second axial direction A2.

Meanwhile, in step S203, the control device 4 activates the second displacement sensor 230 to detect the displacement of the second piston 212 and the second displacement sensor 230 generates the displacement data. Then, in step S204, when the second piston 212 is moved by a predetermined displacement, meaning that the backlash or the contact pattern between the first bevel gear 26 and the second bevel gear 28 reaches a predetermined amount, the control device 4 activate the second brake component 220 to stops the movement of the second piston 212 and fixed the second piston 212 in position. By doing so, the backlash or the contact pattern between the first bevel gear 26 and the second bevel gear 28 is fixed at the predetermined amount. The predetermined displacement of the second piston 212 and the predetermined amount of the backlash or the contact pattern were determined heuristically or by automatic computation result.

The contact pattern between the first bevel gear 26 and the second bevel gear 28 would be adjusted before adjusting the backlash between the first bevel gear 26 and the second bevel gear 28, but the disclosure is not limited thereto. In other embodiments, the backlash between the first bevel gear 26 and the second bevel gear 28 can be adjusted before adjusting the contact pattern between the first bevel gear 26 and the second bevel gear 28.

The adjustment of the contact pattern or the backlash between the first bevel gear 26 and the second bevel gear 28 can be achieved by only adjusting the position of the first bevel gear 26 or the second bevel gear 28 or by simultaneously adjusting the positions of the first bevel gear 26 and the second bevel gear 28. In addition, the above adjustments can be achieved manually, but the disclosure is not limited thereto.

Figure 7:
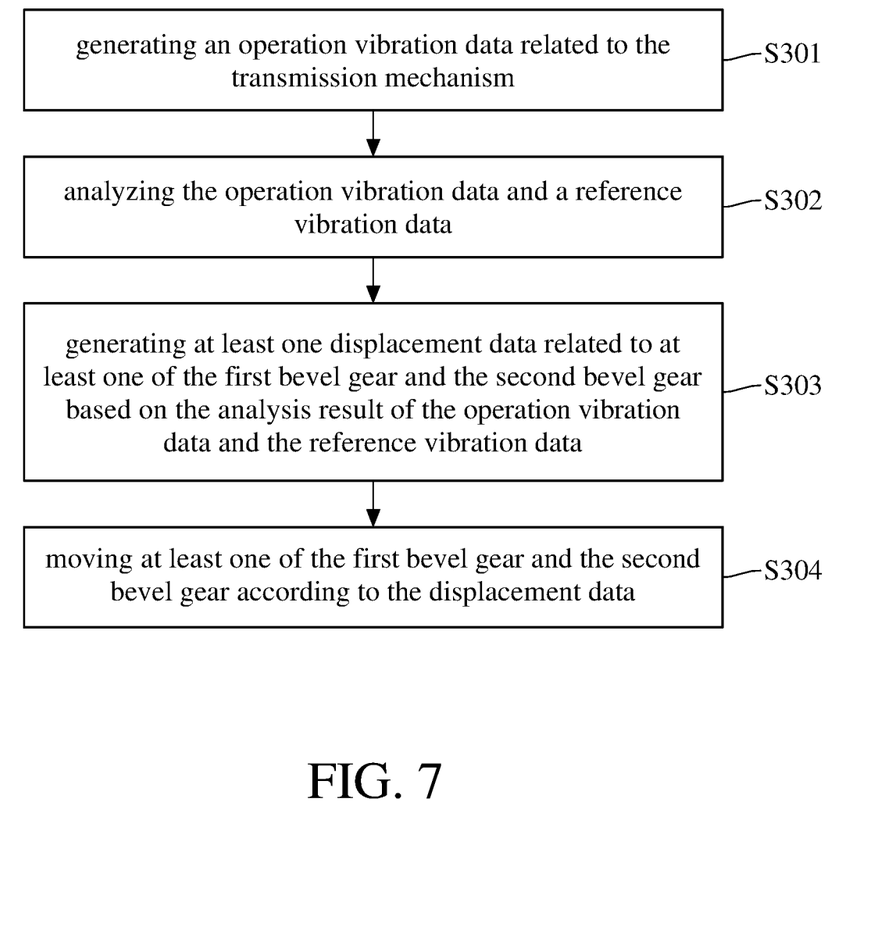
FIG. 7 is a flow chart showing an operation of the automatic adjustment system in FIG. 4.

Referring to FIG. 7, the following paragraphs illustrate an automatic method for operating the automatic adjustment system 1. Note that the components mentioned in the flow chart in FIG. 7 are referred to the automatic adjustment system 1 shown in FIG. 4.

Firstly, in step S301, the detecting device 2 generates an operation vibration data related to the transmission mechanism 20. Then, in step S302, the analysis device 3 analyzes the operation vibration data and a reference vibration data. Then, in step S303, the control device 4 generates at least one displacement data related to at least one of the first bevel gear 26 and the second bevel gear 28 based on the analysis result of the operation vibration data and the reference vibration data. Then, in step S304, the control device 4 activates the related components to move at least one of the first bevel gear 26 and the second bevel gear 28 according to the displacement data.

According to the adjustment device, the automatic adjustment system and the adjustment methods discussed above, the displacements of the bevel gears that can be adjusted by the respective fluid-driven power source, can be detected by the displacement sensor, and can be fixed by the respective brake components. Therefore, at least one of the backlash and the contact pattern between the bevel gears are allowed to be adjusted without detaching and reinstalling the bevel gears.

In addition, the detecting device can be used to detect the activity, such as the vibration of the bevel gears, to timely analyze the current state of the bevel gears and the reference vibration data so as to determine the proper displacement data for the bevel gears. In addition, the bevel gears can be accurately moved by the desired displacements according to such displacement data by the cooperation of the fluid-driven power sources, the displacement sensors and the brake components. As the detecting device detects that the bevel gears is moved by the desired displacements, the respective brake components can be activated to fix the bevel gears in position.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An adjustment device, configured to move a first bevel gear and a second bevel gear that are disposed on a base and are meshed with each other, the adjustment device comprising:
  a first adjustment assembly, comprising:
    a first fluid-driven power source, comprising a first cylinder housing and a first piston, wherein the first cylinder housing is configured to be disposed on the base, the first piston is movably disposed on the first cylinder housing, the first bevel gear is configured to be disposed on the first piston, and the first piston is configured to move the first bevel gear along a first axial direction;
    a first brake component, configured to be disposed on the base and configured to stop or release the first piston; and a first displacement sensor, disposed on the first cylinder housing and configured to generate a displacement data related to the first piston; and a second adjustment assembly, comprising:
a second fluid-driven power source, comprising a second cylinder housing and a second piston, wherein the second cylinder housing is configured to be disposed on the base, the second piston is movably disposed on the second cylinder housing, the second bevel gear is configured to be disposed on the second piston, and the second piston is configured to move the second bevel gear along a second axial direction different from the first axial direction;

a second brake component, disposed on the base and configured to stop or release the second piston; and a second displacement sensor, disposed on the second cylinder housing and configured to generate a displacement data related to the second piston.

2. The adjustment device according to claim 1, wherein the first adjustment assembly further comprises a first elastic component, one end of the first elastic component presses against the base, another end of the first elastic component presses against a side of the first piston that is located away from the first cylinder housing, the second adjustment assembly further comprises a second elastic component, one end of the second elastic component presses against the base, and another end of the second elastic component presses against a side of the second piston that is located away from the second cylinder housing.

3. The adjustment device according to claim 2, wherein the first elastic component and the second elastic component are disc springs.

4. The adjustment device according to claim 1, wherein the first adjustment assembly further comprises a first bearing housing and a first bearing, the first bearing housing is fixed to the first piston, the first bearing is disposed on the first bearing housing, the first bevel gear is configured to be disposed through the first bearing so that the first bevel gear is allowed to be rotatable relative to the first bearing housing, the second adjustment assembly further comprising a second bearing housing and a second bearing, the second bearing housing is fixed to the second piston, the second bearing is disposed on the second bearing housing, and the second bevel gear is configured to be disposed through the second bearing so that the second bevel gear is allowed to be rotatable relative to the second bearing housing.

5. The adjustment device according to claim 4, wherein the first bearing and the second bearing are ball bearings.

6. The adjustment device according to claim 4, wherein the first adjustment assembly further comprising a first friction reduction member, the first friction reduction member is clamped by the first bearing housing and the base to allow the first bearing housing to be moved relative to the base along the first axial direction, the second adjustment assembly further comprises a second friction reduction member, the second friction reduction member is clamped by the second bearing housing and the base to allow the second bearing housing to be moved relative to the base along the second axial direction.

7. The adjustment device according to claim 6, wherein the first friction reduction member and the second friction reduction member are bearing bushings.

8. The adjustment device according to claim 1, wherein the first brake component and the second brake component are brake rings or electromagnetic brakes.

9. An automatic adjustment system for bevel gear, comprising:

a base;
a transmission mechanism, comprising a first shaft, a second shaft, a first bevel gear and a second bevel gear, wherein the first shaft is rotatably disposed on the base about a first axis, the second shaft is rotatably disposed on the base about a second axis different from the first axis, the first bevel gear is fixed on the first shaft and movable along the first axis, the second bevel gear is fixed on the second shaft and movable along the second axis, and the first bevel gear and the second bevel gear are meshed with each other;

the adjustment device according to claim 1;

a detecting device, configured to generate an operation vibration data related to the transmission mechanism;

an analysis device, configured to analyze the operation vibration data and a reference vibration data;

a control device, configured to generate displacement data of the first bevel gear and the second bevel gear based on an analysis result of the operation vibration data and the reference vibration data;

a first driving device, wherein the control device is configured to activate at least one of the first driving device and the second fluid-driven power source to drive the first fluid-driven power source according to the displacement data so as to move at least one of the first bevel gear and the second bevel gear; and a second driving device, wherein the control device is configured to activate the second driving device to activate at least one of the first brake component and the second brake component according to the displacement data so as to stop or release at least of the first piston and the second piston.

10. The automatic adjustment system according to claim 9, wherein the first shaft has a first spline, the first bevel gear has a second spline, the second spline is meshed with the first spline so that the first bevel gear is movable relative to the first shaft along the first axis, the second shaft has a third spline, the second bevel gear has a fourth spline, the fourth spline is meshed with the third spline so that the second bevel gear is movable relative to the second shaft along the second axis.

11. An automatic adjustment method for operating the automatic adjustment system according to claim 9, and the automatic adjustment method comprising:

generating an operation vibration data related to the transmission mechanism;

comparing the operation vibration data and a reference vibration data;

generating at least one displacement data related to at least one of the first bevel gear and the second bevel gear based on an analysis result of the operation vibration data and the reference vibration data; and moving at least one of the first bevel gear and the second bevel gear according to the at least one displacement data.

12. An adjustment method, configured to move at least one of a first bevel gear and a second bevel gear that are meshed with each other, the adjustment method comprising:

activating a first brake component to release a first piston of a first fluid-driven power source, wherein the first bevel gear is configured to be disposed on the first piston;

adjusting an amount of a working fluid that enters into the first fluid-driven power source by a first driving device so as to force the first piston to move relative to a first cylinder housing of the first fluid-driven power source;

detecting a displacement of the first piston by a first displacement sensor; and stopping the first piston by the first brake component as the first piston has moved by a predetermined displacement.

13. The adjustment method according to claim 12, wherein the step of adjusting the amount of the working fluid that enters into the first fluid-driven power source by the first driving device so as to force the first piston to move relative to the first cylinder housing of the first fluid-driven power source comprises:

injecting more of the working fluid into the first fluid-driven power source by the first driving device so as to force the first piston to more extend from the first cylinder housing.

14. The adjustment method according to claim 12, wherein the step of adjusting the amount of the working fluid that enters into the first fluid-driven power source by the first driving device so as to force the first piston to move relative to the first cylinder housing of the first fluid-driven power source comprises:

discharging at least part of the working fluid from the first fluid-driven power source by the first driving device so as to allow a first elastic component to push the first piston to be more retracted to the first cylinder housing.

15. The adjustment method according to claim 12, further comprising:

activating a second brake component to release a second piston of a second fluid-driven power source, wherein the second bevel gear is configured to be disposed on the second piston;

adjusting an amount of another working fluid that enters into the second fluid-driven power source by a second driving device so as to force the second piston to move relative to a second cylinder housing of the second fluid-driven power source;

detecting a displacement of the second piston by a second displacement sensor; and stopping the second piston by the second brake component as the second piston has moved by another predetermined displacement.

16. The adjustment method according to claim 15, wherein the step of adjusting the amount of the another working fluid that enters into the second fluid-driven power source by the second driving device so as to force the second piston to move relative to a second cylinder housing of the second fluid-driven power source comprises:

injecting more of the another working fluid into the second fluid-driven power source by the second driving device so as to force the second piston to more extend from the second cylinder housing.

17. The adjustment method according to claim 15, wherein the step of adjusting the amount of the another working fluid that enters into the second fluid-driven power source by the second driving device so as to force the second piston to move relative to a second cylinder housing of the second fluid-driven power source comprises:

discharging at least part of the another working fluid from the second fluid-driven power source by the second driving device so as to allow a second elastic component to push the second piston to be more retracted to the second cylinder housing.

* * * * *